(12) United States Patent
Li et al.

(10) Patent No.: US 9,773,105 B2
(45) Date of Patent: Sep. 26, 2017

(54) DEVICE SECURITY USING USER INTERACTION ANOMALY DETECTION

(71) Applicant: Xiaomi Inc., Beijing (CN)

(72) Inventors: Yang Li, Beijing (CN); Aibao Luo, Beijing (CN); Han Jiang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/701,186

(22) Filed: Apr. 30, 2015

(65) Prior Publication Data

US 2016/0117500 A1    Apr. 28, 2016

Related U.S. Application Data (63) Continuation-in-part of application No. PCT/CN2015/071303, filed on Jan. 22, 2015.

(30) Foreign Application Priority Data

Oct. 22, 2014    (CN) .......................... 2014 1 0568888

(51) Int. Cl.
*G06F 21/50*    (2013.01)
*G06F 21/88*    (2013.01)
(Continued)

(52) U.S. Cl.
CPC ............ *G06F 21/50* (2013.01); *G06F 21/316* (2013.01); *G06F 21/6245* (2013.01); *G06F 21/88* (2013.01); *H04W 12/12* (2013.01)

(58) Field of Classification Search
CPC ...... G06F 21/50; G06F 21/6245; G06F 21/88; G06F 21/316; H04W 12/12
See application file for complete search history.

(56) References Cited

U.S. PATENT DOCUMENTS 8,966,590 B2 *   2/2015   Janzer ..................... H04L 63/20
                                                          713/152
9,303,999 B2 *   4/2016   Hesch .................. G01C 21/165
(Continued)

FOREIGN PATENT DOCUMENTS

CN        101141721 A       3/2008
CN        102104679 A       6/2011
(Continued)

OTHER PUBLICATIONS

International Search Report dated May 28, 2015 for International Application No. PCT/CN2015/071303, 5 pages.
(Continued)

*Primary Examiner* — Yonas Bayou
(74) *Attorney, Agent, or Firm* — Quarles & Brady LLP (57) ABSTRACT

A mobile device security system can include circuitry configured to receive first user-interaction information associated with the mobile device. The first user-interaction information can be indicative of first sensed interactions of a user with the mobile device during a first period of time. The system can also include circuitry configured to receive second user-interaction information associated with the mobile device. The second user-interaction information can be indicative of second sensed interactions of a user with the mobile device during a second period of time that is subsequent to the first period of time. The system can also include circuitry configured to compare the first and second user-interaction information. The system can also include circuitry configured to report anomaly information to a security service of the mobile device and/or a remote system, where a difference between the first and second user-interaction information exceeds a threshold.

17 Claims, 7 Drawing Sheets

(51) Int. Cl.
  *G06F 21/62* (2013.01)
  *G06F 21/31* (2013.01)
  *H04W 12/12* (2009.01)

(56) References Cited

U.S. PATENT DOCUMENTS

| | | | | |
|---|---|---|---|---|
| 9,331,994 | B2* | 5/2016 | Grigg | H04L 63/08 |
| 9,332,035 | B2* | 5/2016 | Ramaswamy | G06Q 30/02 |
| 9,348,985 | B2* | 5/2016 | Davis | G06F 21/316 |
| 9,405,897 | B1* | 8/2016 | Bailey | G06F 21/44 |
| 9,407,435 | B2* | 8/2016 | Li | H04L 9/0866 |
| 9,497,592 | B2* | 11/2016 | Venkatraman | H04W 4/023 |
| 9,501,744 | B1* | 11/2016 | Zhu | G06N 5/048 |
| 9,517,402 | B1* | 12/2016 | Vogel | G06F 21/316 |
| 2009/0253408 | A1 | 10/2009 | Fitzgerald et al. | |
| 2010/0207721 | A1 | 8/2010 | Nakajima et al. | |
| 2010/0210240 | A1* | 8/2010 | Mahaffey | H04L 41/0253 455/411 |
| 2011/0016534 | A1* | 1/2011 | Jakobsson | G06F 21/316 726/28 |
| 2012/0032891 | A1 | 2/2012 | Parivar | |
| 2012/0046012 | A1* | 2/2012 | Forutanpour | G06F 21/71 455/411 |
| 2012/0147203 | A1 | 6/2012 | Cooley | |
| 2013/0097669 | A1 | 4/2013 | Davis et al. | |
| 2014/0013435 | A1 | 1/2014 | Palumbo et al. | |
| 2014/0123253 | A1* | 5/2014 | Davis | G06F 21/316 726/6 |
| 2014/0282893 | A1 | 9/2014 | Sheller et al. | |
| 2014/0359777 | A1* | 12/2014 | Lam | G06F 21/577 726/25 |
| 2015/0237479 | A1* | 8/2015 | Fung | H04W 4/026 455/456.6 |

FOREIGN PATENT DOCUMENTS

| | | |
|---|---|---|
| CN | 102647508 A | 8/2012 |
| CN | 103024744 A | 4/2013 |
| CN | 103077356 A | 5/2013 |
| CN | 103945060 A | 7/2014 |
| CN | 103957322 A | 7/2014 |
| EP | 2 579 130 A1 | 4/2013 |
| JP | 2001142849 A | 5/2001 |
| JP | 2003-078952 A | 3/2003 |
| JP | 2013-118536 A | 6/2013 |
| JP | 2013-176000 A | 9/2013 |
| JP | 2014120953 A | 6/2014 |
| KR | 10-2009-0126399 A | 12/2009 |
| KR | 10-2012-0068777 A | 6/2012 |
| KR | 10-1341555 B1 | 12/2013 |
| RU | 2303811 C1 | 7/2007 |
| RU | 101231 U1 | 1/2011 |
| WO | WO 2013/155143 A1 | 10/2013 |

OTHER PUBLICATIONS

Extended European Search Report dated Jan. 25, 2016 for European Application No. 15190406.7, 7 pages.
International Search Report dated May 28, 2015 for International Application No. PCT/CN2015/071303, 2 pages.
Office Action dated Jul. 8, 2016 for European Application No. 15190406.7, 5 pages.
Office Action dated Jan. 19, 2016 for Korean Application No. 10-2015-7007074, 7 pages.
Office Action for Chinese Application No. 201410568888.9 dated Nov. 30, 2016.
Office Action for Japanese Application No. 2016-554793 dated Dec. 12, 2016.
Office Action for Russian Patent Application No. 2015114997 dated Jun. 9, 2016.
Office Action for Japanese Patent Application No. 2016-554793 dated Apr. 4, 2017, 2 pages.

* cited by examiner

DEVICE SECURITY USING USER INTERACTION ANOMALY DETECTION

CROSS-REFERENCE TO RELATED APPLICATIONS/INCORPORATION BY REFERENCE

This application is a continuation-in-part of International Application No. PCT/CN2015/071303 with an international filing date of Jan. 22, 2015, which is based upon and claims priority to Chinese Patent Application No. CN201410568888.9, filed on Oct. 22, 2014, the entire contents of which are incorporated herein by reference.

TECHNICAL FIELD

The present disclosure relates to a device security system (such as a mobile device security system) that uses user-interaction anomaly detection.

BACKGROUND

Smart devices provide various applications and functions for users. These applications and functions help users to achieve more convenient and rapid life styles, such that users can become more efficient with smart devices. Although smart devices provide for great enhancements in personal efficiency, such devices can store personal and private data. Consequently, there is a security issue if such devices are lost or stolen.

SUMMARY

According to the present disclosure, a user's routine or habits relevant to his or her mobile device can be tracked and recorded, so that historical user-interaction information can be compared against more current user-interaction information. If such comparisons provide that there are an amount of anomalies in the current user-interaction information that exceeds a predetermined threshold, then security operations (such as reporting the anomaly to a security system) can occur. In other words, if there are anomalies in user interactions with the mobile device, the device can detect such anomalies and use that information for security measures. These features can provide for an added safeguard if the mobile device falls into the wrong hands. These features are especially useful where the mobile device does not require the user to log in to the device to use it.

This summary and the following detailed descriptions merely recite examples and do not limit the present disclosure.

BRIEF DESCRIPTION OF THE DRAWINGS

Non-limiting and non-exhaustive examples are described with reference to the following figures. The components in the drawings are not necessarily to scale, and like referenced numerals designate corresponding parts throughout the different views.

DETAILED DESCRIPTION

Subject matter described herein is intended to be construed as not being limited to examples set forth herein; examples are provided merely to be illustrative. The following detailed description is not intended to be limiting on the scope of what is claimed.

Figure 1:
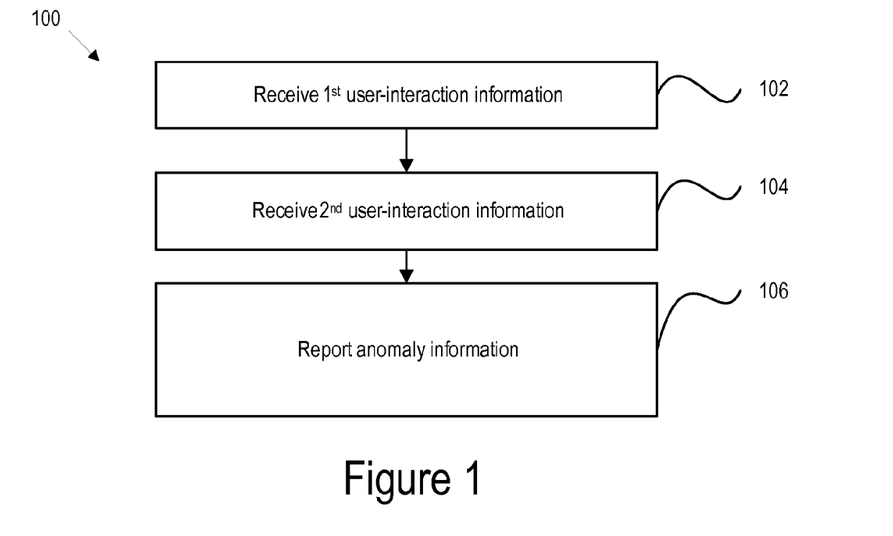
FIGS. 1, 2, and 4 are flowcharts illustrating example operations of example device security systems using user-interaction anomaly detection.

FIG. 1 is a flowchart illustrating example operations 100 of example device security system using user-interaction anomaly detection. The operations 100 may commence with receiving first user-interaction information at 102, and subsequently receiving second user-interaction information at 104. The second user-interaction information being from a subsequent time period relative to a time period associated with the first user-interaction information. Upon receiving such information, it may be recorded as user habit or routine information. In an example, the user-interaction information may include height information (such as the height at which the terminal is positioned when the user performs an operation), holding manner (such as holding on the left hand or holding on the right hand), distance between the terminal and eyes of the user, holding angle (such as the angle of the terminal to the horizontal direction or the vertical direction when the user performs an operation), human biological characteristic information of the user (such as hand shape, fingerprint, face shape, iris characteristics, retina characteristics, pulse characteristics, auricle characteristics, or height of user), contiguous tapping speed, interface switching manner (such as tapping the key "Return" on the screen interface or tapping the key "Return" on the terminal), screen unlocking manner (such as sliding the unlocking identifier to the icon "Unlock" or to the icon "Conversation"), and/or trajectory pattern of touch gesture (such as the length of the sliding distance when the user slides the unlocking identifier).

In an example, the system may include a configuration feature so that various parameters described herein such as user interactions, differences between such interactions, and thresholds are configurable by the user, developer, and/or administrator of the system. Also, such configurations may be automated through machine learning techniques once the system receives a predetermined amount of user interactions. Also, the information used in the features described herein and in the configuration features may include sources of the mobile device or remote devices (such as remote servers). The device may collect usual operation behavior and information of the user, and directly analyze the collected usual operation behavior and information and obtain use routine information of the user. Also, the device may upload the collected data to a server and receive the user routine information determined by an analytics server.

Once the first and second user-interaction information is received anomalies can be determined in the second user-interaction information with respect to the first user-interaction information, and such anomalies can be reported to an aspect of the system at 106. In other words, habits of a user from the second period do not match to a certain degree habits of a user from the first period, so the system reports on such a mismatch. In an example, the reported anomaly information may include human biological characteristic information of the user of the second period (such as a face image of the user picked up via a front camera), geographical location information of the device and/or information of a corresponding base station used by the device during the second period, and a predetermined message to the system or another device of the user. The anomaly information may also include differences within the time periods in height information (such as the height at which the terminal is positioned when the user performs an operation), holding manner (such as holding on the left hand or holding on the right hand), distance between the terminal and eyes of the user, holding angle (such as the angle of the terminal to the horizontal direction or the vertical direction when the user performs an operation), human biological characteristic information of the user (such as hand shape, fingerprint, face shape, iris characteristics, retina characteristics, pulse characteristics, auricle characteristics, or height of user), contiguous tapping speed, interface switching manner (such as tapping the key "Return" on the screen interface or tapping the key "Return" on the terminal), screen unlocking manner (such as sliding the unlocking identifier to the icon "Unlock" or to the icon "Conversation"), and/or trajectory pattern of touch gesture (such as the length of the sliding distance when the user slides the unlocking identifier).

With such features and other features described herein identity information of a user of the second period may be determined or at least it may be determined that the user in the first and second periods are different. In an example, an actual identity of the user of the second period may be determined and such information may be reported to the user, the system, and third party systems such as systems of law enforcement entities. Such features can assist in remedying the device being lost or stolen. For example, such features can identify the device being lost or stolen before the user becomes aware of such a situation.

Figure 2:
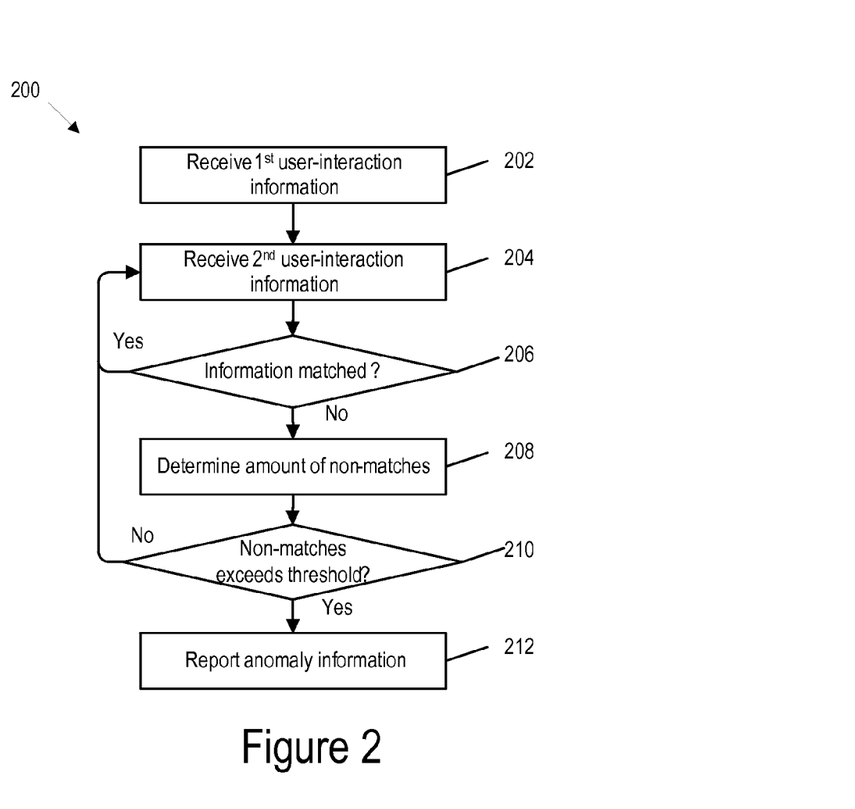

FIG. 2 is a flowchart illustrating example operations 200 of an example device security system using user-interaction anomaly detection. The operations 200 may commence with receiving the first user-interaction information at 202, and subsequently receiving the second user-interaction information at 204. Similar to operations 100, in this example, the first user-interaction information may be received from the mobile device or a remote system (such as a remote server). In an example, such as this one, the mobile device may collect the second user-interaction information in real time or according to a predetermined period, and analyze and determine whether the user within that time period is a predetermined user associated with the device. In another example, the mobile device may perform collection and analysis on the second user-interaction information after a corresponding command is received. For instance, the user may disable these features of collecting user-interaction information and identifying the user's identity, but when the user is aware that the device is missing or other exceptional circumstances occur, the user may activate the features.

Figure 3:
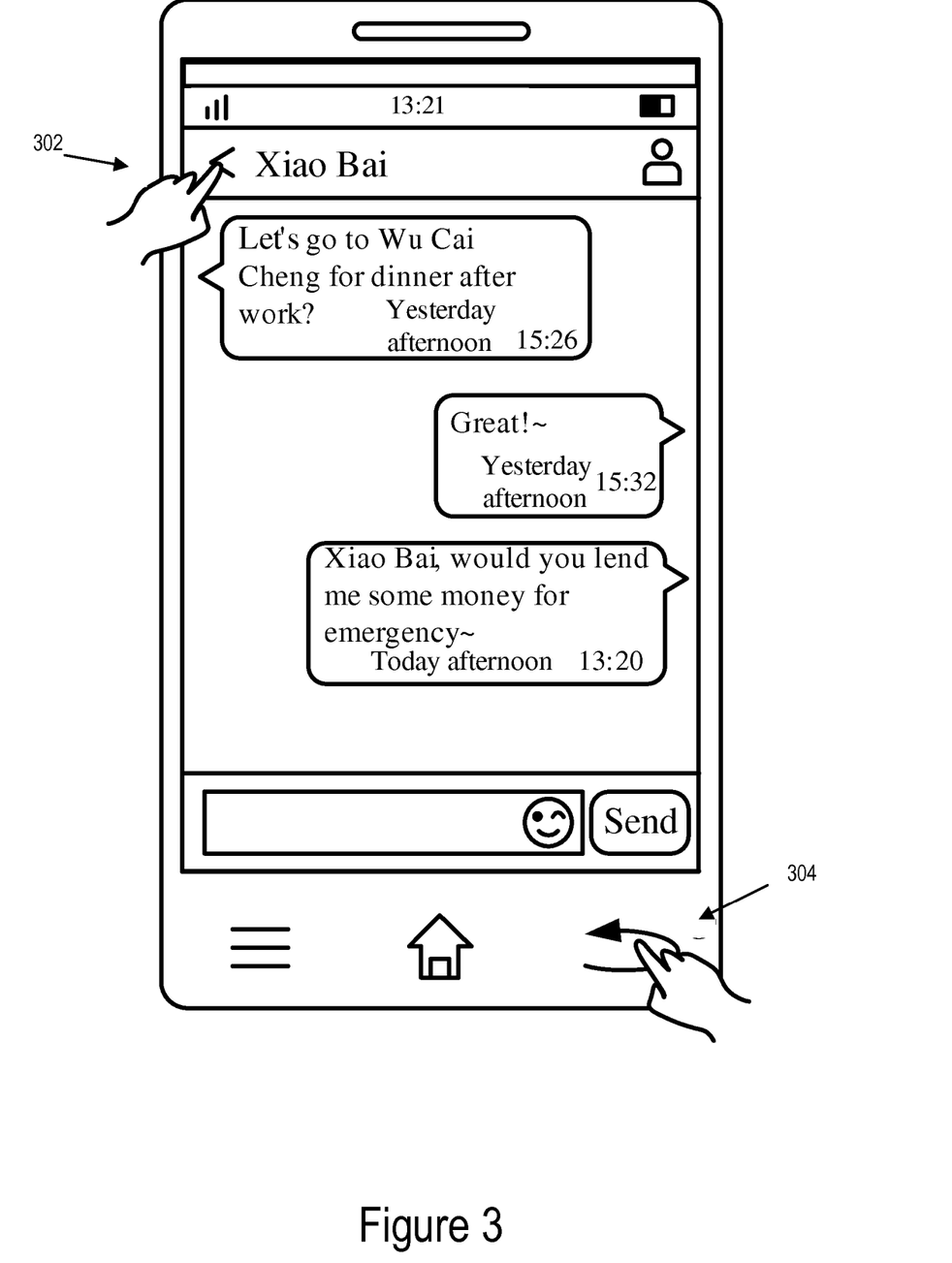
FIGS. 3 and 5 are example front perspectives of a mobile device, which illustrate user interactions with the mobile device that may be tracked by an example device security system.

At 206, the system determines if there is a match between the first and second user-interaction information. Where the system determines that there is a match, the operations 200 return to the operation at 204; and otherwise, at 208 the system determines the amount of non-matches that have occurred up to this point, including the last non-match identified. For example, in instances of switching between interfaces of an application on a mobile device the matching operation at 206 may check if one of usual routines for switching between interfaces is being used by the user. An application generally includes a plurality of application interfaces, and the plurality of application interfaces can be organized in a hierarchical relationship. In such an instance, the user may switch to an ancestor interface of a present interface by selecting a corresponding link to such an operation. As illustrated in FIG. 3, the present interface is an interface for chatting with "Xiao Bai", and if the user desires to return to an ancestor interface in the interface hierarchy, such a switch may be implemented via the operation 302, which is tapping the corresponding linked icon on the screen interface. Alternatively, such an operation may occur after operation 304, which is pressing a corresponding user-input element off the screen interface. Thus, when the user performs operation 302 for such a task instead of operation 304, it may be determined that a non-match has occurred.

At 208, the last non-match accounts for by the system and the system determines the number of non-matches up to the last non-match. If the count of non-matches exceeds a predetermined threshold, then the system reports corresponding anomaly information to the security system or the user, so that the system or the user can be notified to take a predetermined action, for example.

In an example, such as this one, a timer may be used to track a frequency of non-matches. It may be determined whether the timer is operating correctly and then the frequency of non-matches can be determined. For example, when the operations 200 move to 208, it may be determined whether a timer is present; if the timer is present and the time duration has not expired, the corresponding counted non-matches is present, and the amount for measuring the frequency can be increased by one non-match. Where no timer is present, a timer may be started and a count of mismatches may commence.

At 210, it is determined whether the number of non-matches exceeds a threshold. If the number of non-matches exceeds the threshold, then the system reports the anomaly information to a predetermined recipient at 212, such as the user or a predetermined aspect of the security system that can take security measures.

Figure 4:
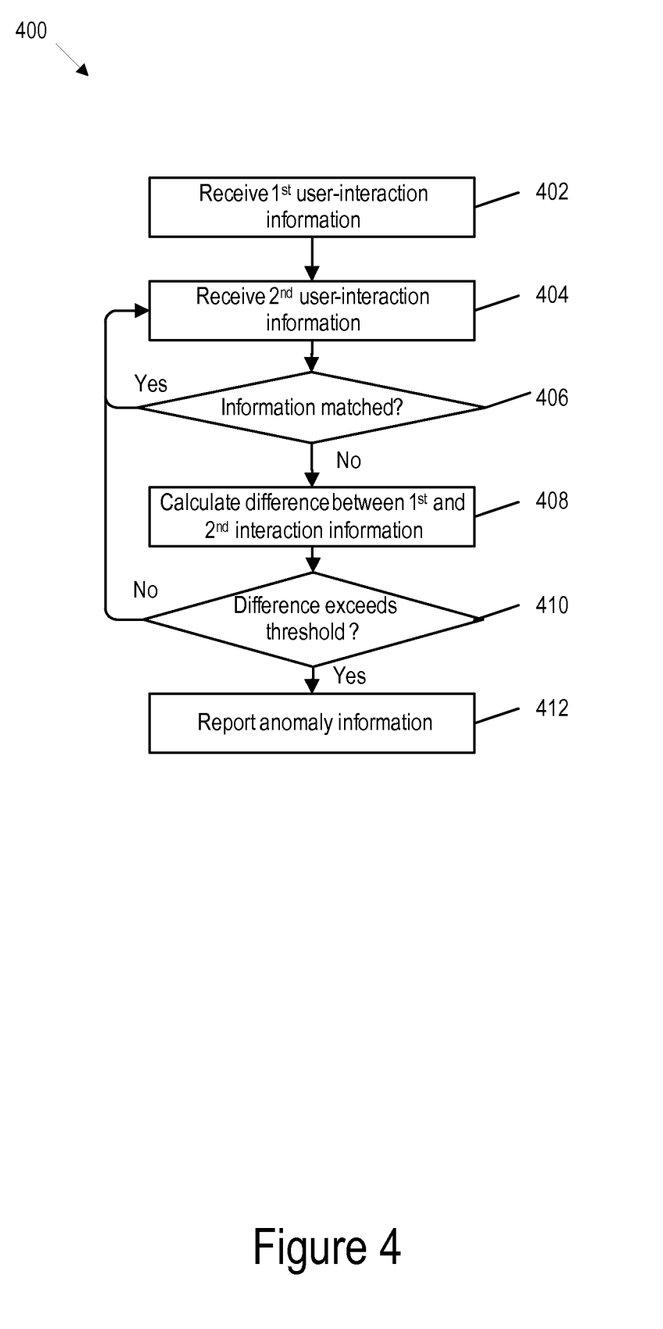

FIG. 4 is a flowchart illustrating example operations 400 of an example device security system using user-interaction anomaly detection. The operations 400 may commence with receiving the first user-interaction information at 402, and subsequently receiving the second user-interaction information at 404. Similar to operations 100 and 200, in this example, the first user-interaction information may be received from the mobile device or a remote system (such as a remote server). In an example, such as this one, the mobile device may collect the second user-interaction information in real time or according to a predetermined period, and analyze and determine whether the user within that time period is a predetermined user associated with the device. In another example, the mobile device may perform collection and analysis on the second user-interaction information after a corresponding command is received. For instance, the user may disable these features of collecting user-interaction information and identifying the user's identity, but when the user is aware that the device is missing or other exceptional circumstances occur, the user may activate the features.

At 406, the system determines if there is a match between the first and second user-interaction information. Where the system determines that there is a match, the operations 400 return to the operation at 404; and otherwise, at 408 the system calculates a degree of difference between the first and second user-interaction information.

For instance, using "screen unlocking" as an example, the matching operation in at 406 may determine if instances of screen unlocking is different in the first and second periods. After a screen of a device is locked, if the screen is lit again, a screen-locking interface may be displayed on the screen of the device, and the screen is unlocked via a screen unlocking operation performed by the user.

Figure 5:
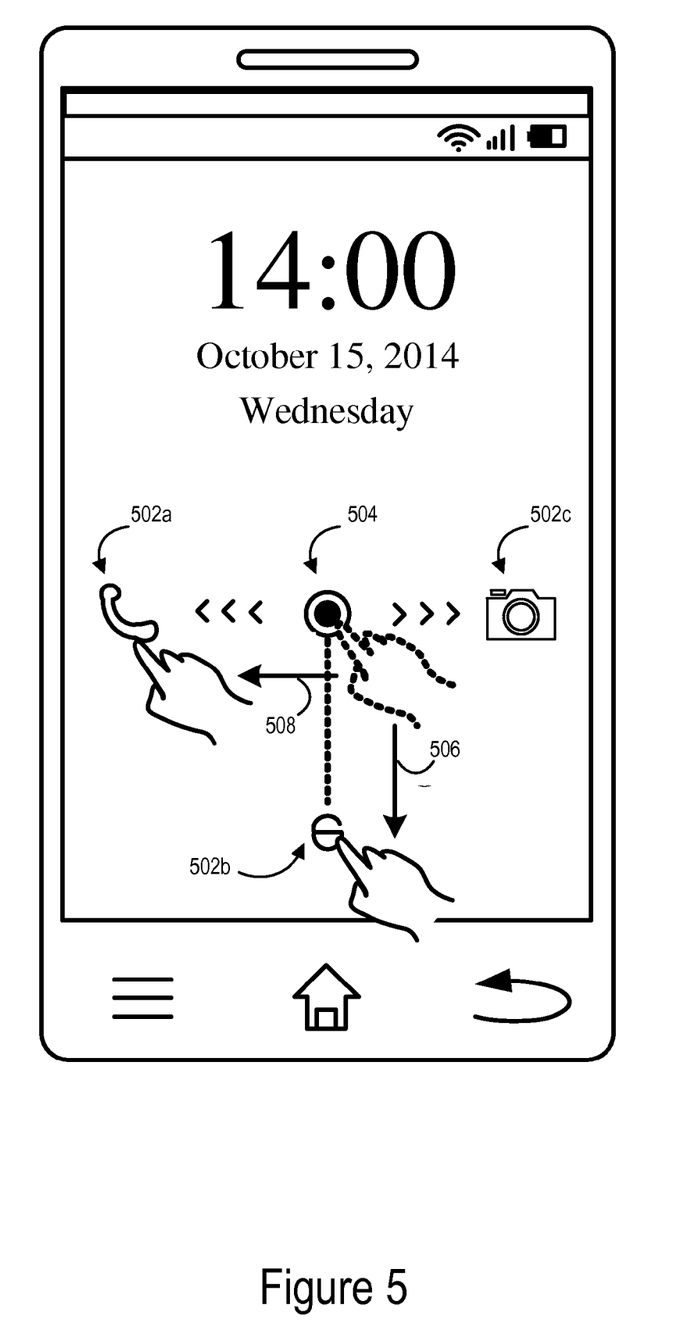

As illustrated in FIG. 5, a plurality of icons may be present on the screen-locking interface of a mobile device, including a plurality of icons linked to an unlocking mechanism. In FIG. 5 icons 502a, 502b and 502c, each may be linked to an operation for unlocking the screen. Thus, a user may develop a habit or a certain frequency for use of such icons from this screen. The user may develop the routine of swiping from the middle icon 504 to icon 502a when making a phone call. Or the user may develop the routine of swiping from the middle icon to 502b to first unlock the screen and then select a user input for making a phone call. Either way a routine may be established in the first time period that differs from a routine from the lock screen in a second time period. Such as difference may be an indication of another user using the device. Also, a user may use both routines but at different frequencies.

At 408, the system determines a difference between user interactions in the first and second time periods. The difference may be with respect to the frequency of certain routines between periods, or differences within a routine. For example, differences within a routine may include speeds of swiping or swiping paths and/or lengths.

Using the screen-unlocking interface as illustrated in FIG. 5 as an example, the operation parameter may be a movement direction of an operation identifier. Where the first operation parameter and the second operation parameter respectively correspond to the operation 506 and the operation 508 as illustrated in FIG. 5, the difference may be an angle difference between the movement directions, for example, in this case, the difference is 90 degrees. The operation parameter may be a movement distance of the operation identifier. When the first operation parameter and the second operation parameter both employ the operation 506 and the operation 508 as illustrated in FIG. 5, the difference may be a difference between the movement distances, for example, 0.5 cm.

At 410, it is determined whether the difference exceeds predetermined threshold, such as a threshold for a particular type of operation. If the difference exceeds the threshold, the anomaly is reported. Otherwise, the system continues to receive the second user-interaction information at 404.

Also, for example, when the first operation parameter and the second operation parameter respectively correspond to the operation 506 and the operation 508 as illustrated in FIG. 5, and assuming that the predetermined threshold is 10 degrees, when the angle difference between the movement directions is 90 degrees, it indicates that the current user may be an unauthorized user, and thus the device may be subject to loss or theft. Also, for example, when the first operation parameter and the second operation parameter both employ the operation 506 and the operation 508 as illustrated in FIG. 5, and assuming that the predetermined threshold is 0.3 cm, when the value difference between the movement distances is 0.5 cm, it indicates that the current user may be an unauthorized user, and thus the terminal may be subject to loss or theft.

At 412, the anomaly information is reported to the predetermined aspect of the security system or the user via a different device, for example.

Figure 6:
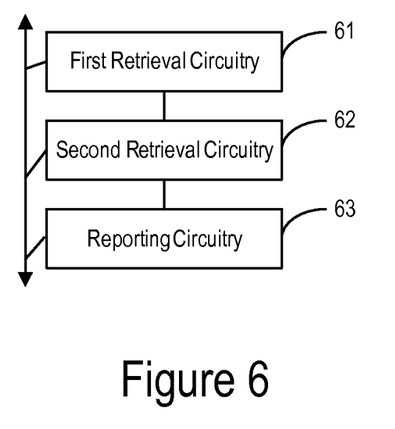
FIGS. 6-9 are block diagrams illustrating example electronic aspects of example device security systems using user-interaction anomaly detection.

FIG. 6 is a block diagram illustrating example electronic aspects of an example device security system using user-interaction anomaly detection. FIG. 6 depicts first retrieval circuitry 61, second retrieval circuitry 62, and a reporting circuitry 63. The first retrieval circuitry unit 61 is configured to receive and record first user-interaction information of a user on a mobile device of a first time period. The second retrieval circuitry unit 62 is configured to receive and record second user-interaction information of the user on the mobile device of a second time period subsequent to the first time period. The reporting circuitry 63 is configured to report anomaly information to a predetermined object when the first and second user-interaction information does not match to a certain extent.

Figure 7:
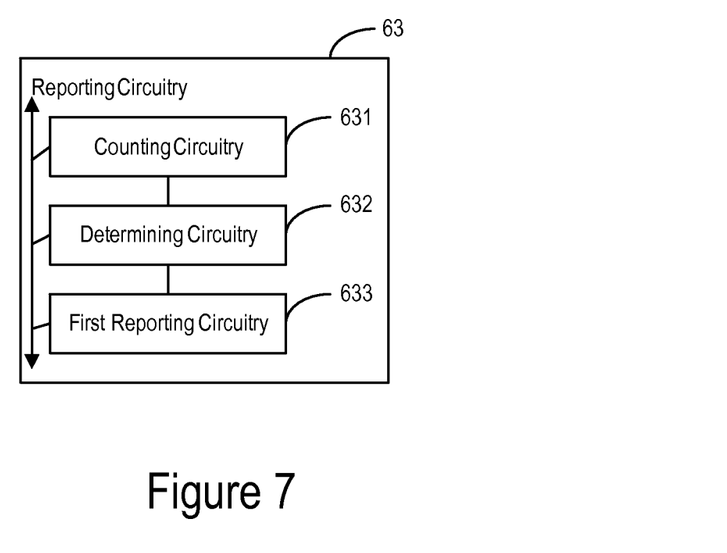

FIG. 7 is a block diagram illustrating example electronic aspects of the reporting circuitry 63. FIG. 7 depicts counting sub-circuitry 631, a determining sub-circuitry 632, and first reporting sub-circuitry 633. The counting sub-circuitry 631 is configured to count the number of times of non-matching events within a predetermined time duration. The determining sub-circuitry 632 is configured to determine whether the counted number of times is greater than or equal to a predetermined threshold of the number of times. The first reporting sub-circuitry 633 is configured to report the anomaly information to the predetermined object if the counted number of times is greater than or equal to the predetermined threshold of the number of times.

Figure 8:
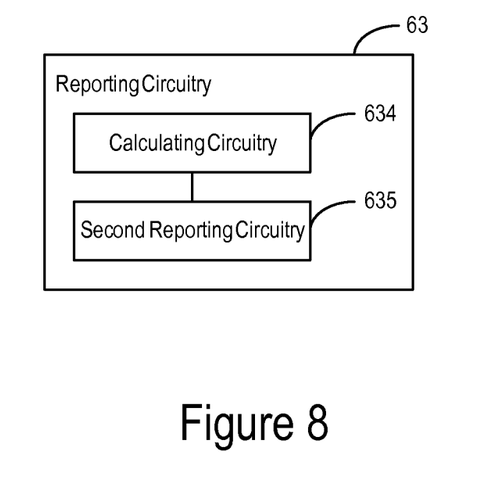

FIG. 8 is a block diagram illustrating example electronic aspects of other reporting circuitry 83. The other reporting circuitry 83 may replace the reporting circuitry in FIGS. 6 and 9. The reporting circuitry 83 includes calculating sub-circuitry 634 and second reporting sub-circuitry 635. The calculating sub-circuitry 634 is configured to calculate a value difference between a first operation parameter corresponding to the first user-interaction information and a second operation parameter corresponding to the second user-interaction information. The second reporting sub-circuitry 635 is configured to report the anomaly information to the predetermined object if the value difference is greater than or equal to a predetermined value difference threshold.

Figure 9:
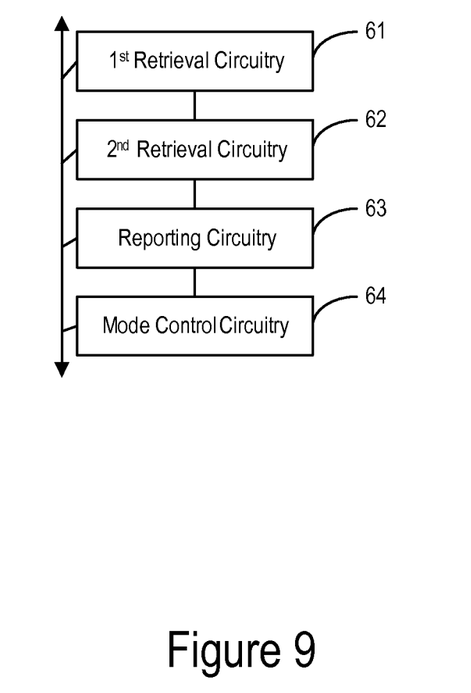

FIG. 9 is a block diagram illustrating example electronic aspects of an example device security system using user-interaction anomaly detection. FIG. 9 depicts similar circuitries to FIG. 6 and mode control circuitry 64. The mode control circuitry 64 is configured to switch the terminal to a function restriction mode and/or upload terminal data to a predetermined secure storage space and delete local terminal data, when the first and second user-interaction information does not match.

Figure 10:
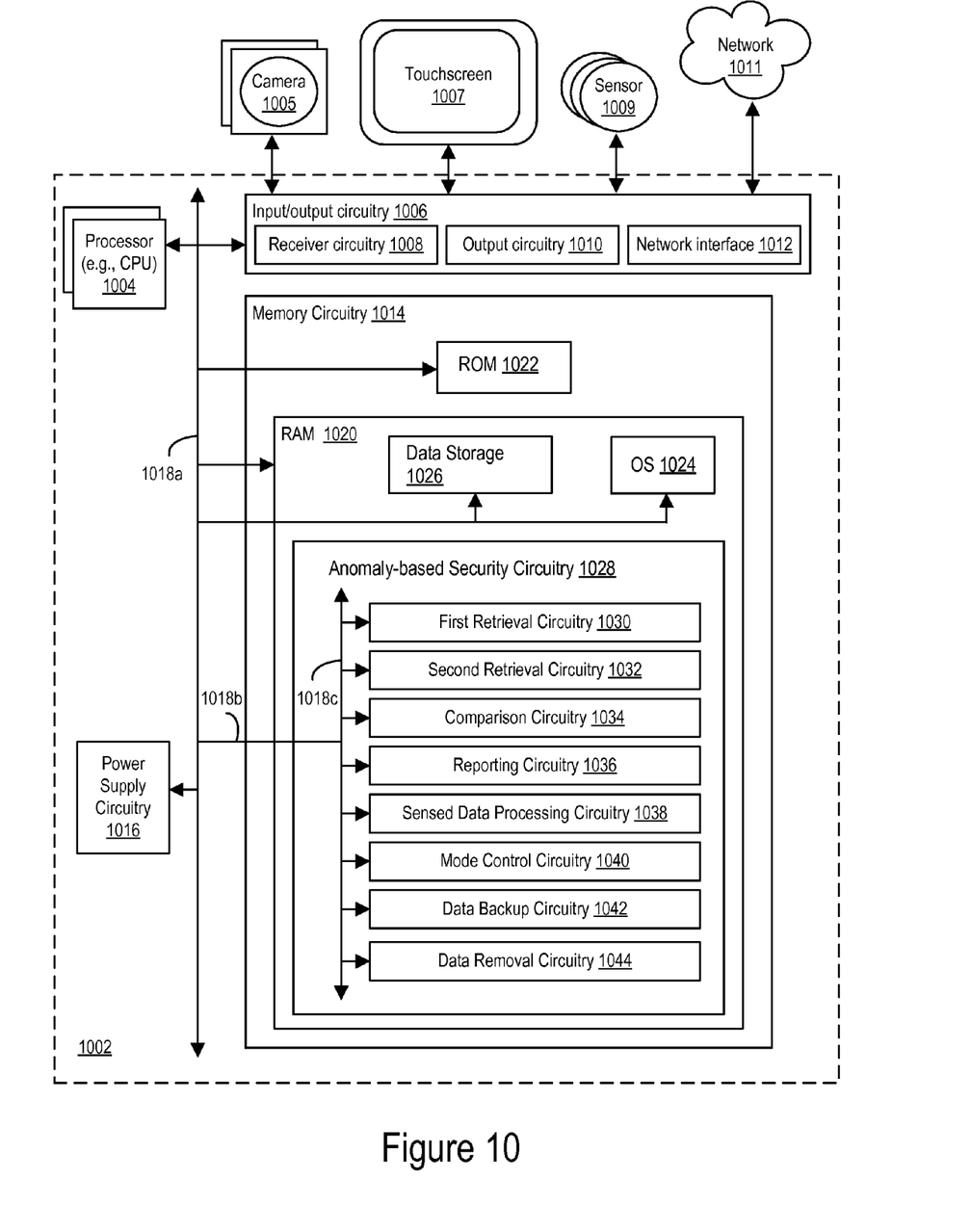
FIG. 10 is a block diagram illustrating an example mobile device including an example device security system using user-interaction anomaly detection.

FIG. 10 is a block diagram illustrating an example mobile device 1002 including an example device security system using user-interaction anomaly detection. Such a system may include circuitries configured to execute the operations illustrated in FIGS. 1, 2 and 4. Such a system may also include the circuitries of FIGS. 6-9. The mobile device 1002 may be an actual mobile device (such as a smartphone or a tablet computer), any type of personal computer, a digital broadcast terminal (such as a smart TV), a messaging device, a part of a gaming console, a medical device, a part of exercise equipment, and a personal digital assistant, for example. The mobile device 1002 includes anomaly-based security circuitry 1028 (such as anomaly-based security circuitry that can perform the operations 100, 200, and 400). The mobile device 1002 also includes input/output circuitry 1006, such as receiver circuitry 1008 and output circuitry 1010. The input/output circuitry also includes a network interface 1012. The mobile device 1002 also includes a processor 1004, memory circuitry 1014, a power supply circuitry 1016, and communication buses 1018a-1018c that connect at least the aforementioned elements of the mobile device.

The processor 1004 can be any type of data processing device, such as a central processing unit (CPU). Also, for example, the processor 1004 can be central processing logic. The processor may also include multiple CPU, such as multiple coprocessors. The mobile device 1002 may also include or at least connect to a display, a touchscreen 1007, and one or more cameras 1005. The display may be a part of the touchscreen 1007. Each of these components may interact with the anomaly-based security circuitry 1028 and the processor 1004. Also, the processor 1004 may control operations of the mobile device 1002, such as the operations associated with displayed graphical user interfaces, telephone calls, data communications, camera operations, recording operations, and various types of data processing, such as the operations 100, 200, and 400.

The memory circuitry 1014, which can include random access memory (RAM) 1020 or read-only memory (ROM) 1022, can be enabled by various types of known memory devices. The RAM 1020 can store data and instructions defining an operating system 1024, data storage circuitry 1026, and anomaly-based security circuitry 1028. Although in FIG. 10 the anomaly-based security circuitry is depicted as a part of the RAM 1020, in these examples and others, the anomaly-based security circuitry may include hardware (such as microprocessors), firmware, software, or any combination thereof. The ROM 1022 can include basic input/output system (BIOS) of the electronic mobile device 1002. Aspects of the memory circuitry 1014 can store various types of data to support operations of the mobile device 1002, such as in the data storage circuitry 1026. Examples of such data include instructions for any applications or operations of the mobile device 1002, messages, pictures, and video. Aspects of the memory circuitry 1014 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), such as ROM 1022, a magnetic memory, a flash memory, a magnetic or optical disk, or any combination thereof.

The input/output components can include the interfaces for facilitating communication between any components of the electronic mobile device 1002, components of external devices (such as a digital camera, a digital video recorder, a display, or components of other devices of a network 1011), and end users. For example, such components can include a network card that is an integration of a receiver, a transmitter, and I/O interfaces. The I/O components can include user interfaces such as monitors, keyboards, touchscreens (such as touchscreen 1007), microphones, and speakers. Further, some of the I/O components and the buses 1018a-1018c can facilitate communication between components of the electronic mobile device 1002, and can ease processing performed by the processor 1004.

Multimedia devices included in or associated with the mobile device 1002 may include a screen providing an output interface between the device and a user. In some examples, the touchscreen 1007 may include a liquid crystal display (LCD) and a touch panel (TP). If the touchscreen 1007 includes the touch panel, it may be implemented to receive input signals from a user. The touch panel includes one or more touch sensors to sense touches, swipes, and other types of gestures on the touch panel. The touch sensors may not only sense a boundary of a touch or swipe action, but also sense a period of time and a pressure associated with the touch or swipe action.

In some examples, the mobile device may include at least one of a front-facing camera and a rear-facing camera. For example, the one or more cameras 1005 may include a front-facing camera and a rear-facing camera. The front-facing camera and/or the rear-facing camera may receive an external multimedia datum while the mobile device 1002 is in an operation mode, such as a photographing mode or a video mode. Each of the one or more cameras 1005 may be a fixed optical lens system or have focus and optical zoom capability.

The mobile device may also include an audio component configured to output and/or input audio signals. For example, an audio component may include a microphone configured to receive an external audio signal when the mobile device 1002 is in an operation mode, such as a call mode, a recording mode, and a voice recognition mode. The received audio signal may be further stored in a part of the memory circuitry 1014 or transmitted via the network interface 1012. In some examples of the mobile device 1002, a speaker may be included.

The depicted input/output circuitry of the mobile device 1002 may provide an interface between the processor 1004 and peripheral interface components, such as a keyboard, a click wheel, and buttons, for example. The buttons may include a home button, a volume button, a starting button, and a locking button.

Sensor components 1009 of the mobile device 1002 may include one or more sensors to provide status assessments of various aspects of the device. For example, a sensor component may detect an open/closed status of the mobile device 1002, relative positioning of the device and its components (e.g., a display and a keypad) of the mobile device 1002, a change in position of the device or a component of the device, a presence or absence of user contact with the device, an orientation or an acceleration/deceleration of the device, and a change in temperature of the device. A sensor component may include a proximity sensor configured to detect the presence of nearby objects without any physical contact. A sensor component may also include a light sensor, such as a CMOS or CCD image sensor, for use in imaging applications. In some examples, a sensor component may also include an accelerometer sensor, a gyroscope sensor, a magnetic sensor, a pressure sensor, or a temperature sensor. In some examples, a sensor component may also include an accelerometer sensor, a gyroscope sensor, a magnetic sensor, a pressure sensor, or a temperature sensor. The sensor components 1009 and any of the other input/output components described herein (such as the components of the input/output circuitry 1006) may be a source of the user-interaction information received in the operations described herein (such as the operations 100, 200, and 400).

The network interface 1012 can include a receiver and a transmitter (or a transceiver), and an antenna for wireless communications. The network interface 1012 may be configured to facilitate communication, wired or wirelessly, between the mobile device 1002 and other devices. The mobile device 1002 can access a wireless network (such as a part of the network 1011) based on a communication standard, such as WiFi, 2G, or 3G, or a combination thereof. In an example, the network interface 1012 may receive a broadcast signal or broadcast associated information from an external broadcast management system via a broadcast channel. Also, the network interface 1012 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power supply circuitry 1016 contains power components, and facilitates supply and management of power to the electronic mobile device 1002. The power supply circuitry 1016 may provide power to various components of the mobile device 1002. The power supply circuitry 1016 may include a power management system, one or more power sources, and any other components associated with the generation, management, and distribution of power in the mobile device 1002.

The aspects of the mobile device 1002 described herein may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Also, aspects may be provided by a non-transitory computer-readable storage medium including instructions, such as included in the memory circuitry 1014, executable by the processor 1004, for performing operations described herein. For example, the non-transitory computer-readable storage medium may be a ROM, a RAM, a CD-ROM, a magnetic tape, a floppy disc, an optical data storage device, or any combination thereof.

In an example, parts of the I/O circuitry 1006 of the mobile device 1002, such as the receiver circuitry 1008 and the network interface 1012, can be configured to receive user-interaction information from interactions with the mobile device (such as via the receiver circuitry) or from over the network 1011 (such as via the network interface). Raw data associated with the user-interaction information may be received from one or more of the one or more cameras 1005, the touchscreen 1007, and the one or more sensors 1009.

The anomaly-based security circuitry 1028 is communicatively coupled to the receiver circuitry 1008 and the output circuitry 1010. The anomaly-based security circuitry 1028 can include sub-circuitries to perform any of the operations described herein.

In an example (such as the example depicted in FIG. 10), the mobile device 1002 includes a memory device at least including the memory circuitry 1014, and the processor 1004. As depicted, the mobile device 1002 can include anomaly-based security circuitry 1028, which is part of the RAM 1020. Alternatively, this security circuitry may include at least part of a memory device including the RAM 1020 and the processor 1004.

Within the anomaly-based security circuitry 1028, first data retrieval circuitry 1030 can be configured to receiving first user-interaction information of a user using the mobile device. The first user-interaction information can be indicative of first measurable interactions of the user with the mobile device during a first period of time. The anomaly-based security circuitry 1028 can also include second data retrieval circuitry 1032 configured to receive second user-interaction information of a user using the mobile device. The second user-interaction information can be indicative of second measurable interactions of the user with the mobile device during a second period of time that is subsequent to the first period of time.

The anomaly-based security circuitry 1028 can also include comparison circuitry 1034 that can be configured to compare the second user-interaction information against the first user-interaction information. In such a comparison, the comparison circuitry 1034 can also be configured to identify, in the first user-interaction information and the second user-interaction information, user interactions with the mobile of a set of selected types of user interactions. This results in first identified user interactions of the first user-interaction information and second identified user interactions of the second user-interaction information. Also, in such a comparison the comparison circuitry 1034 can also be configured to identify an amount of non-matching user interactions between the first and second identified user interactions and determine the difference between the first user-interaction information and the second user-interaction information according to the amount of non-matching user interactions.

The anomaly-based security circuitry 1028 can also include reporting circuitry 1036 configured to report anomaly information including the difference to a security service of the mobile device, a remote system (such as one or more designated remote servers), or both, where a difference between the first user-interaction information and the second user-interaction information exceeds a likeness threshold. The anomaly information can also include the second measurable interactions. The anomaly information can also include human biological characteristic information of the first and/or second time period, geographical location information of mobile device of the first and/or second time period, or both.

The anomaly-based security circuitry 1028 can also include sensed data processing circuitry 1038 configured to determine the first sensed interactions and the second sensed interactions according to the sensed user interactions within the first and second time periods by the one or more cameras 1005, touchscreen 1007, and/or the one or more sensors 1009, respectively. With respect to these circuitries and others described herein, the first and/or second sensed interactions can include an assessed height of the user or any other assessed human biological characteristic of the user, a frequent grip, a height above ground of the mobile device, a frequent distance between a part of the mobile device and an eye of the user, a frequent tilt of the mobile device when held by the user, a frequent speed of completing a selected touchscreen gesture, a frequent routine for switching between applications, a frequent routine for screen locking, unlocking, or both, and a frequent set of coordinates along a path of a selected touchscreen gesture, a frequent geographical location of the mobile device, a frequently used base station by the mobile device, a frequent travel route of the mobile device, or any combination thereof.

The anomaly-based security circuitry 1028 can also include mode control circuitry 1040 configured to switch the mobile device to a predetermined functionally restrictive mode of operation, where the difference between the first user-interaction information and the second user-interaction information exceeds the likeness threshold. The anomaly-based security circuitry 1028 can also include data backup circuitry 1042 configured to upload preselected types of data stored locally on the mobile device to the secured storage block of the remote system. The anomaly-based security circuitry 1028 can also include data removal circuitry 1044 configured to remove the preselected types of data stored locally on the mobile device subsequent to the uploading of the preselected types of data.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only with a true scope and spirit of the invention being indicated by the following claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A mobile device, comprising:
   one or more processors; and
   one or more memory devices that store instructions executable by the one or more processors;
   wherein the one or more processors when executing the instructions:
   receive first user-interaction information indicative of first sensed interactions of a user with the mobile device during a first period of time;
   receive second user-interaction information indicative of second sensed interactions of a user with the mobile device during a second period of time that is subsequent to the first period of time;
   compare the second user-interaction information against the first user-interaction information;
   report anomaly information to a security service of the mobile device, a remote system, or both, where an amount of anomaly between the first user-interaction information and the second user-interaction information exceeds a likeness threshold, the anomaly information including a difference between the first user-interaction information and the second user-interaction information:
   upload preselected types of data stored locally on the mobile device to a secured storage block of the remote system, when the amount of anomaly between the first user-interaction information and the second user-interaction information exceeds the likeness threshold; and
   remove the preselected types of data stored locally on the mobile device subsequent to the uploading of the preselected types of data, when the amount of anomaly between the first user-interaction information and the second user-interaction information exceeds the likeness threshold.

2. The mobile device of claim 1, further comprising:
   at least one sensor that senses user interactions with the mobile device; and
   wherein the one or more processors when executing the instructions further determine the first sensed interactions and the second sensed interactions according to the sensed user interactions, respectively.

3. The mobile device of claim 1, wherein the first sensed interactions, the second sensed interactions, or both, include an assessed height of a user or any other assessed human biological characteristic of a user, a frequent grip, a height above ground of the mobile device, a frequent distance between a part of the mobile device and an eye of a user, a frequent tilt of the mobile device when held by a user, a frequent speed of completing a selected touchscreen gesture, a frequent routine for switching between applications, a frequent routine for screen locking, unlocking, or both, and a frequent set of coordinates along a path of a selected touchscreen gesture, a frequent geographical location of the mobile device, a frequently used base station by the mobile device, a frequent travel route of the mobile device, or any combination thereof.

4. The mobile device of claim 1, wherein when comparing the second user-interaction information against the first user-interaction information, the one or more processors further:
   identify, in the first user-interaction information and the second user-interaction information, predetermined user interactions with the mobile device of a set of predetermined types of user interactions, resulting in first identified user interactions of the first user-interaction information and second identified user interactions of the second user-interaction information;
   identify an amount of non-matching user interactions between the first identified user interactions and the second identified user interactions; and
   determine a difference between the first user-interaction information and the second user-interaction information according to the amount of non-matching user interactions.

5. The mobile device of claim 1, wherein the anomaly information further includes the second sensed interactions.

6. The mobile device of claim 1, wherein the anomaly information further includes human biological characteristic information of the second time period, geographical location information of mobile device of the second time period, or both.

7. The mobile device of claim 1, wherein the one or more processors when executing the instructions further switch the mobile device to a predetermined functionally restrictive mode of operation, where the difference between the first user-interaction information and the second user-interaction information exceeds the likeness threshold.

8. A method, comprising:
   sensing, by at least one sensor of a mobile device, user interactions with the mobile device within a first time period and a second time period that is subsequent to the first time period;
   determining, by sensed data processing circuitry of the mobile device, first sensed interactions and second sensed interactions according to the sensed user interactions, respectively;
   receiving, by first data retrieval circuitry of a mobile device, first user-interaction information indicative of the first sensed interactions of a user with the mobile device during the first time period;
   receiving, by second data retrieval circuitry of the mobile device, second user-interaction information indicative of the second sensed interactions of a user with the mobile device during the second period of time;
   comparing, by comparison circuitry of the mobile device, the second user-interaction information against the first user-interaction information;
   when an amount of anomaly between the first user-interaction information and the second user-interaction information exceeds a likeness threshold, reporting, by reporting circuitry of the mobile device, anomaly information to a security service of the mobile device, a remote system, or both, the anomaly information including a difference between the first user-interaction information and the second user-interaction information;

uploading, by data backup circuitry of the mobile device, preselected types of data stored locally on the mobile device to a secured storage block of the remote system when the amount of anomaly between the first user-interaction information and the second user-interaction information exceeds the likeness threshold; and removing, by data removal circuitry of the mobile device, the preselected types of data stored locally on the mobile device subsequent to the uploading of the preselected types of data when the amount of anomaly between the first user-interaction information and the second user-interaction information exceeds the likeness threshold.

9. The method of claim 8, wherein the first sensed interactions include an assessed height of a user or any other assessed human biological characteristic of a user, a frequent grip, a height above ground of the mobile device, a frequent distance between a part of the mobile device and an eye of a user, a frequent tilt of the mobile device when held by a user, a frequent speed of completing a selected touchscreen gesture, a frequent routine for switching between applications, a frequent routine for screen locking, unlocking, or both, and a frequent set of coordinates along a path of a selected touchscreen gesture, a frequent geographical location of the mobile device, a frequently used base station by the mobile device, a frequent travel route of the mobile device, or any combination thereof.

10. The method of claim 8, wherein the comparing the second user-interaction information against the first user-interaction information includes:

identifying, in the first user-interaction information and the second user-interaction information, predetermined user interactions with the mobile device of a set of predetermined types of user interactions, resulting in first identified user interactions of the first user-interaction information and second identified user interactions of the second user-interaction information;

identifying an amount of non-matching user interactions between the first identified user interactions and the second identified user interactions; and determining a difference between the first user-interaction information and the second user-interaction information according to the amount of non-matching user interactions.

11. The method of claim 8, wherein the anomaly information further includes the second sensed interactions.

12. The method of claim 8, wherein the anomaly information further includes human biological characteristic information of the second time period, geographical location information of mobile device of the second time period, or both.

13. The method of claim 8, further comprising switching, by mode control circuitry of the mobile device, the mobile device to a predetermined functionally restrictive mode of operation, where the difference between the first user-interaction information and the second user-interaction information exceeds the likeness threshold.

14. A non-transitory computer readable medium, comprising:

instructions executable by a processor to receive first user-interaction information indicative of first sensed interactions of a user with a mobile device during a first period of time;

instructions executable by a processor to receive second user-interaction information indicative of second sensed interactions of a user with the mobile device during a second period of time that is subsequent to the first period of time;

instructions executable by a processor to compare the second user-interaction information against the first user-interaction information;

instructions executable by a processor to report anomaly information to a security service of the mobile device, a remote system, or both, where an amount of anomaly between the first user-interaction information and the second user-interaction information exceeds a likeness threshold, the anomaly information including a difference between the first user-interaction information and the second user-interaction information;

instructions executable by a processor to upload preselected types of data stored locally on the mobile device to a secured storage block of the remote system, when the amount of anomaly between the first user-interaction information and the second user-interaction information exceeds the likeness threshold; and instructions executable by a processor to remove the preselected types of data stored locally on the mobile device subsequent to the uploading of the preselected types of data, when the amount of anomaly between the first user-interaction information and the second user-interaction information exceeds the likeness threshold.

15. The non-transitory computer readable medium of claim 14, wherein the first sensed interactions include an assessed height of a user or any other assessed human biological characteristic of a user, a frequent grip, a height above ground of the mobile device, a frequent distance between a part of the mobile device and an eye of a user, a frequent tilt of the mobile device when held by a user, a frequent speed of completing a selected touchscreen gesture, a frequent routine for switching between applications, a frequent routine for screen locking, unlocking, or both, and a frequent set of coordinates along a path of a selected touchscreen gesture, a frequent geographical location of the mobile device, a frequently used base station by the mobile device, a frequent travel route of the mobile device, or any combination thereof.

16. The non-transitory computer readable medium of claim 14, further comprising:

instructions executable by a processor to identify, in the first user-interaction information and the second user-interaction information, predetermined user interactions with the mobile device of a set of predetermined types of user interactions, resulting in first identified user interactions of the first user-interaction information and second identified user interactions of the second user-interaction information;

instructions executable by a processor to identify an amount of non-matching user interactions between the first identified user interactions and the second identified user interactions; and instructions executable by a processor to determine a difference between the first user-interaction information and the second user-interaction information according to the amount of non-matching user interactions.

17. The non-transitory computer readable medium of claim 14, further comprising instructions executable by a processor to switch the mobile device to a predetermined functionally restrictive mode of operation, where the difference between the first user-interaction information and the second user-interaction information exceeds the likeness threshold.

\* \* \* \* \*